(12) United States Patent
Sarafianos et al.

(10) Patent No.: US 10,691,840 B2
(45) Date of Patent: Jun. 23, 2020

(54) SECURE ELECTRONIC CHIP

(71) Applicant: STMicroelectronics (Rousset) SAS, Rousset (FR)

(72) Inventors: Alexandre Sarafianos, Trets (FR); Jimmy Fort, Puyloubier (FR); Clement Champeix, Aix-en-Provence (FR); Jean-Max Dutertre, Bouc Bel Air (FR); Nicolas Borrel, Martigues (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 1095 days.

(21) Appl. No.: 15/137,789

(22) Filed: Apr. 25, 2016

(65) Prior Publication Data

US 2017/0116439 A1     Apr. 27, 2017

(30) Foreign Application Priority Data

Oct. 22, 2015  (FR) ..................... 15 60089

(51) Int. Cl.
| | |
|---|---|
| *G06F 21/86* | (2013.01) |
| *G09C 1/00* | (2006.01) |
| *H04L 9/00* | (2006.01) |
| *H01L 23/00* | (2006.01) |
| *H03K 5/153* | (2006.01) |
| *H03K 5/24* | (2006.01) |

(52) U.S. Cl.
CPC ............. *G06F 21/86* (2013.01); *G09C 1/00* (2013.01); *H01L 23/576* (2013.01); *H03K 5/153* (2013.01); *H03K 5/24* (2013.01); *H04L 9/004* (2013.01); *H04L 2209/12* (2013.01)

(58) Field of Classification Search
CPC .................................................... H01L 23/576
See application file for complete search history.

(56) References Cited

U.S. PATENT DOCUMENTS

| | | |
|---|---|---|
| 2009/0251168 A1 | 10/2009 | Lisart et al. |
| 2013/0200371 A1 | 8/2013 | Marinet et al. |
| 2014/0111230 A1 | 4/2014 | Lisart et al. |

FOREIGN PATENT DOCUMENTS

CN           103383736 A        11/2013

OTHER PUBLICATIONS

Aktan, O. et al., "Optoelectronic CMOS Power Supply Unit for Electrically Isolated Microscale Applications," IEEE Journal of Selected Topics in Quantum Electronics 17(3):747-756, May/Jun. 2011.
Borrel, N. et al., "Electrical model of an NMOS body biased structure in triple-well technology under photoelectric laser stimulation," Microelectronics Reliability, pp. FA.1.1-FA.1.6, Apr. 2015.

(Continued)

*Primary Examiner* — Walter H Swanson
(74) *Attorney, Agent, or Firm* — Seed Intellectual Property Law Group LLP

(57) ABSTRACT

A secure electronic chip including a plurality of biased semiconductor wells and a well biasing current detection circuit. Each of the wells includes a transistor and a bias contact electrically isolated from the transistor. The detection circuit is electrically coupled to each bias contact and is configured to detect a bias current passing through the bias contact that is indicative of an attempt to tamper with the electronic chip.

20 Claims, 3 Drawing Sheets

(56) References Cited

OTHER PUBLICATIONS

Dodds, N. A. et al., "Effectiveness of SEL Hardening Strategies and the Latchup Domino Effect," IEEE Transactions on Nuclear Science 59(6):2642-2650, Dec. 2012.

Dutertre, J.M. et al., "Improving the ability of Bulk Built-In Current Sensors to detect Single Effects by using triple-well CMOS," Microelectronics Reliability 54:2289-2294, 2014.

SECURE ELECTRONIC CHIP

This application claims the priority benefit of French Patent application number 15/60089, filed on Oct. 22, 2015, the contents of which is hereby incorporated by reference in its entirety to the maximum extent allowable by law.

BACKGROUND

Technical Field

The present application relates to electronic chips, particularly to electronic chips protected against attacks.

Description of the Related Art

Electronic chips containing confidential data, such as bank card chips, may undergo attacks from hackers aiming at determining the operation of the chip and at extracting the confidential information therefrom. An attack may be carried out on the chip in operation connected between the terminals of a power source. A way to carry out such an attack is for a hacker to scan the chip surface with a pulsed laser beam which disturbs the chip operation. The observation of the consequences of such disturbances, sometimes called faults, enables the hacker to carry out the attack. To disturb the chip operation, the hacker may also form contacts on the chip surface and apply voltages thereto. The hacker may also arrange a coil close to the chip surface to emit electromagnetic disturbances.

It is desirable to have electronic chips protected against this type of attack, called fault injection attack, known devices having various disadvantages and implementation issues.

BRIEF SUMMARY

Thus, an embodiment provides a secure electronic chip comprising a plurality of biased semiconductor wells and a well biasing current detection circuit.

According to an embodiment, the detection circuit is capable of generating an alert signal when the bias current is greater, in absolute value, than a threshold.

According to an embodiment, the detection circuit comprises a resistive element conducting the bias current, the detection circuit being capable of detecting a voltage across the resistive element.

According to an embodiment, the resistive element has a resistance in the range from 1 to 100Ω.

According to an embodiment, the secure electronic chip comprises a power supply circuit capable of providing a potential for biasing said wells, the detection circuit being capable of detecting a variation of a potential regulating the bias potential.

According to an embodiment, the power supply circuit comprises an operational amplifier having its output coupled to the gate of a first MOS transistor and the detection circuit comprises a second MOS transistor forming a current mirror with the first MOS transistor, an input of the operational amplifier and the drain of the first MOS transistor being coupled to said wells, and the detection circuit being capable of detecting a variation of the current in the second transistor.

According to an embodiment, the plurality of wells comprises first wells of a first conductivity type and second wells of a second conductivity type, the detection circuit comprising on the one hand a first circuit detecting the bias current of the first wells and on the other hand a second circuit detecting the bias current of the second wells.

According to an embodiment, the first wells are formed in the upper portion of a semiconductor substrate of the second conductivity type and the second wells are upper portions of the substrate comprised between the first wells.

According to an embodiment, the first wells and the second wells extend on a doped buried layer of the first conductivity type covering a substrate of the second conductivity type.

Another embodiment provides a method of protecting an electronic chip comprising a plurality of biased semiconductor wells, comprising a step of detecting the well biasing current.

According to an embodiment, the chip contains confidential data, the method comprising, when the detected bias current is greater than a threshold, a step of destroying the confidential data.

According to an embodiment, the method comprises, when the detected bias current is greater than a threshold, a step of stopping the activity of the chip.

The foregoing and other features and advantages will be discussed in detail in the following non-limiting description of specific embodiments in connection with the accompanying drawings.

DETAILED DESCRIPTION

Figure 1:
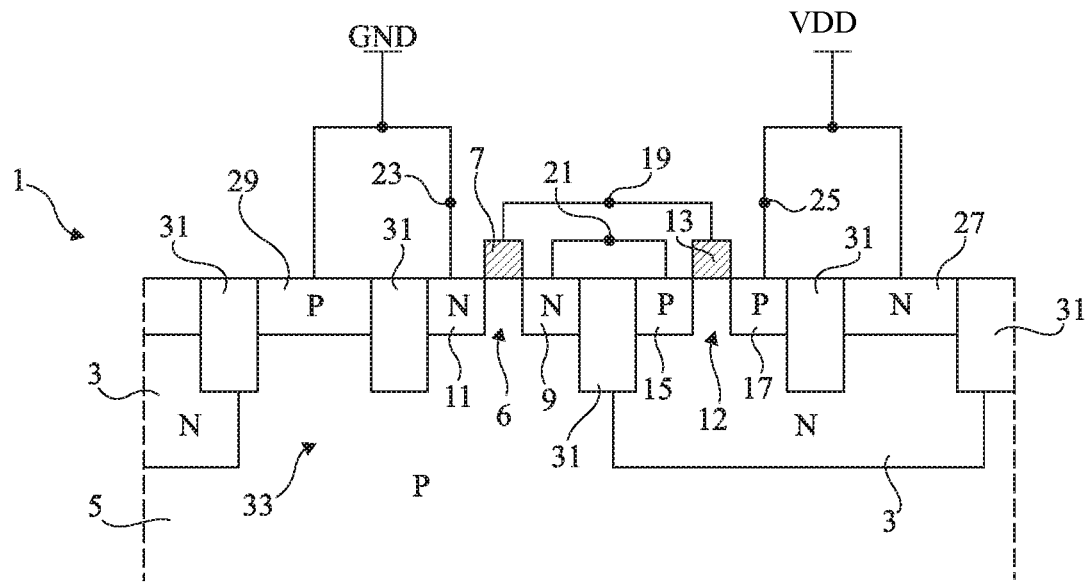
FIG. 1 is a simplified partial cross-section view of an electronic chip of a first type.

The same elements have been designated with the same reference numerals in the different drawings and, further, the various drawings are not to scale. For clarity, only those elements which are useful to the understanding of the described embodiments have been shown and are detailed.

In the following description, when reference is made to terms qualifying the relative position, such as term "upper", reference is made to the orientation of the concerned element in the drawings.

In the present description, term "connected" designates a direct electric connected between two elements, while term "coupled" designates an electric connection between two elements which may be direct or via one or a plurality of other passive or active components, such as resistors, capacitors, inductances, diodes, transistors, etc.

FIG. 1 is a partial simplified cross-section view of an electronic chip 1 of a first type comprising N-type doped semiconductor wells 3 formed in the upper portion of a P-type doped semiconductor substrate 5. For clarity, only a well and a portion of another well are shown in FIG. 1.

N-channel MOS transistors 6 are formed inside and on top of the substrate portions located between wells 3 and comprise gates 7 and drain and source areas 9 and 11. P-channel MOS transistors 12 are formed inside and on top of wells 3 and comprise gates 13 and drain and source areas 15 and 17. The transistors are coupled together to form circuits, for example, digital circuits. As an illustration, an inverting logic circuit between nodes 19 and 21 is shown. The digital circuits comprise power supply nodes 23 and 25. In the shown example, power supply nodes 23 and 25 are respectively coupled to sources 11 and 17 of transistors 6 and 12.

N-type doped wells 3, or N wells, are provided with bias contacts 27, and the substrate is provided with bias contacts 29. The transistors and the bias contacts are separated by trench isolations 31.

A reference potential GND, for example, the ground, is applied both on power supply nodes 23 and on bias contacts 29 of the P wells. A power supply circuit, not shown, comprised in the chip, provides a potential VDD applied both to power supply node 25 and to bias contacts 27 of the N wells.

In the following description, in an electronic chip of the first type, the upper portions 33 of the substrate comprised between N wells will be called P wells.

Figure 2:
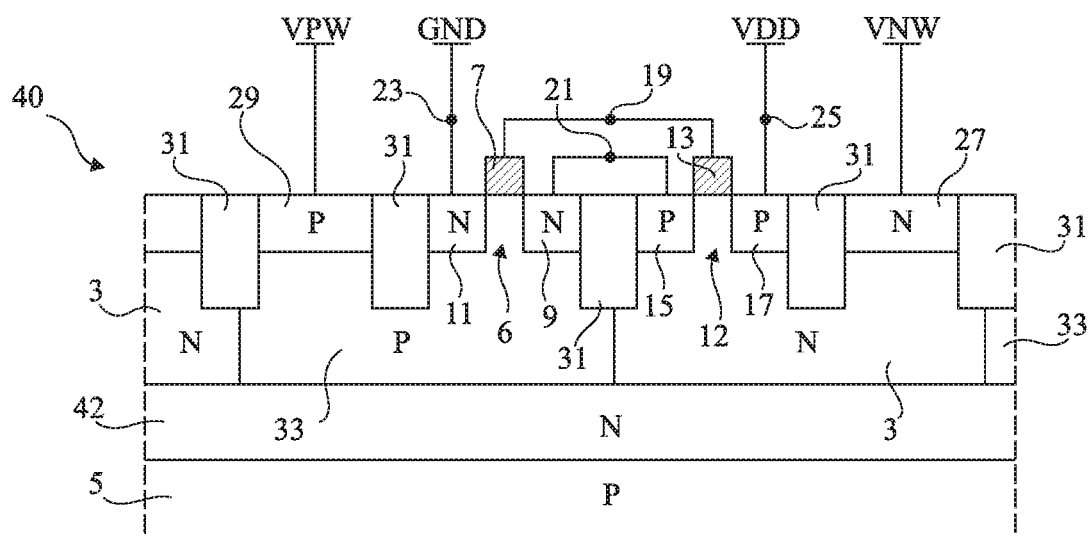
FIG. 2 is a simplified partial cross-section view of an electronic chip of a second type.

FIG. 2 is a simplified partial cross-section view of an electronic chip 40 of a second type comprising N wells 3 and P wells 33 extending on an N-type doped buried layer 42 covering a P-type substrate 5.

Wells 3 and 33 correspond to wells 3 and 33 of previously-described chip 1, that is, they comprise bias contacts 27 and 29 and digital circuits formed by transistors 6, 12 formed inside and on top of the wells. The digital circuits are provided with power supply nodes 23 and 25.

The digital circuits are powered between ground GND and a potential VDD respectively applied to nodes 23 and 25. Bias potentials VPW and VNW, which may be different from potentials GND and VDD, are respectively applied to bias contacts 29 and 27, and are provided by power supply circuits, not shown, comprised in the chip.

As indicated as a preamble, for circuits containing confidential data, a pirate is capable of carrying out a fault injection analysis. Modes of detection of such attacks are described hereafter.

Figure 3:
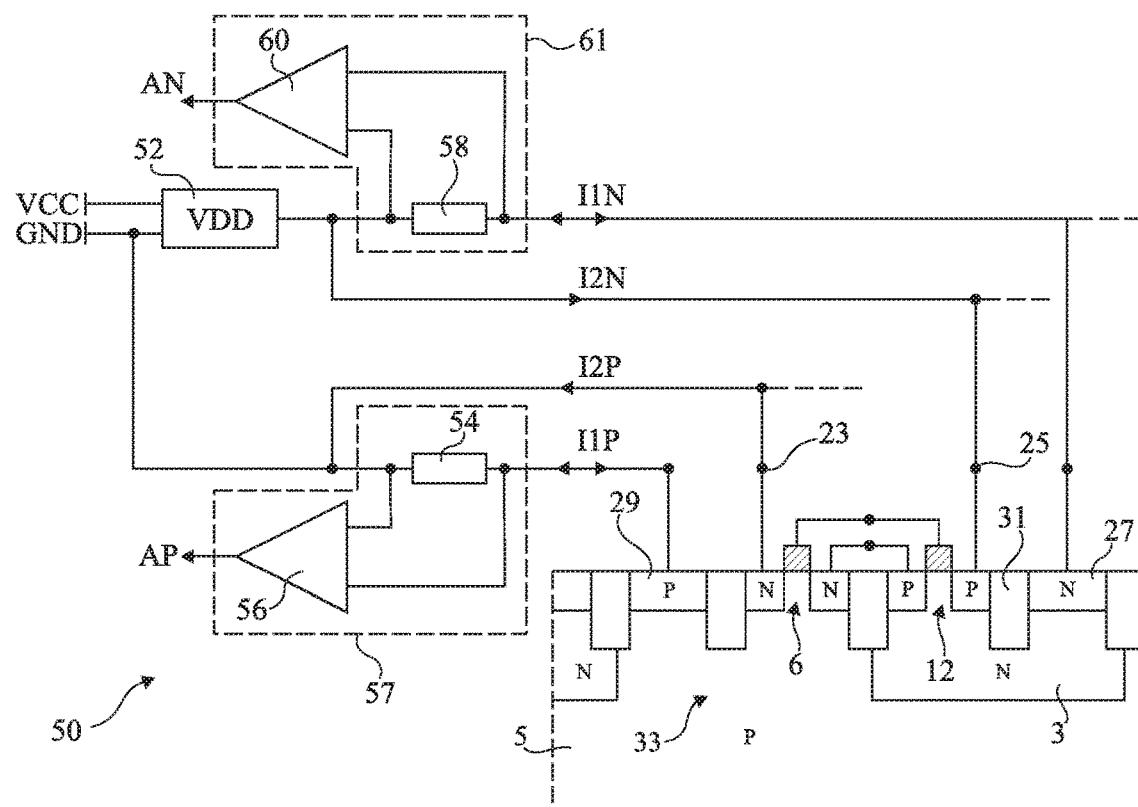
FIG. 3 shows an embodiment of an electronic chip of the first type protected against attacks.

FIG. 3 shows an embodiment of an electronic chip 50 of the first type protected against attacks. FIG. 3 comprises a partial cross-section view of chip 50 and a representation of circuits comprised in this chip.

Chip 50 comprises the elements of chip 1 described in relation with FIG. 1 and particularly N wells 3 and P wells 33. Circuits, for example, digital circuits, comprise transistors 6 formed inside and on top of P wells 33 and transistors 12 formed inside and on top of N wells 3. The digital circuits have power supply nodes 23 and 25 and wells 3 and 33 are provided with respective bias contacts 27 and 29. The bias contacts and the transistors are separated by trench insulators 31.

Power supply nodes 23 of the circuits are coupled to ground. Further, chip 50 comprises a power supply circuit 52 (VDD) which provides a potential VDD applied to power supply nodes 25. Power supply circuit 52 is itself powered with a positive potential VCC and a ground potential GND provided by a power supply source, not shown, external to chip 50.

Bias contacts 29 of the P wells are not directly grounded, but are coupled to ground by a resistive element 54 comprised in the chip. The voltage across resistive element 54 is compared with a threshold by a comparator circuit 56 capable of generating an alert signal AP when this voltage is greater than the threshold. Resistive element 54 and comparator circuit 56 thus form a detection circuit 57 that detects the bias current of wells 33.

Bias contacts 27 of the N wells are coupled to power supply circuit 52 by a resistive element 58. The voltage across resistive element 58 is compared with a threshold by a comparator circuit 60 capable of generating an alert signal AN when this voltage is greater than the threshold. Resistive element 58 and comparator circuit 60 thus form a detection circuit 61 that detects the bias current of wells 3.

In normal operation, the junctions between the N wells and the substrate are reverse biased, and no significant bias current flows through resistive elements 54 and 58. The above-mentioned thresholds can thus be very low.

During an attempt of fault injection attack on the chip, for example, at the time when a pirate bombards the chip with a laser beam, currents I1N and I1P appear between bias contacts 27 of N wells 3 and bias contacts 29 of P wells 33. Bias currents I1N and I1P are detected by detection circuits 57 or 61 and cause the transmission of alert signals AN or AP. The signal is used by the chip to take countermeasures such as suspending or stopping its activity or destroying confidential data that it contains.

During an attempt of attack by a pirate, currents I1P and I1N resulting from a disturbance of the chip operation are analyzed by the chip to detect the attack. Bias currents I1N and I1P used to detect the attack directly correspond to the currents resulting from the disturbance. Thus, the chip detects an injected power much lower than the minimum fault injection power. Thereby, chip 1 is advantageously protected against any fault injection attack, whatever the location of the attack on the chip surface.

As an example, resistors 54 and 58 may be in the range from 1 to 100Ω. As a variation, resistive elements 54 and 58 may be components or portions of the chip, for example, well portions, capable of generating a voltage when conducting current.

Figure 4:
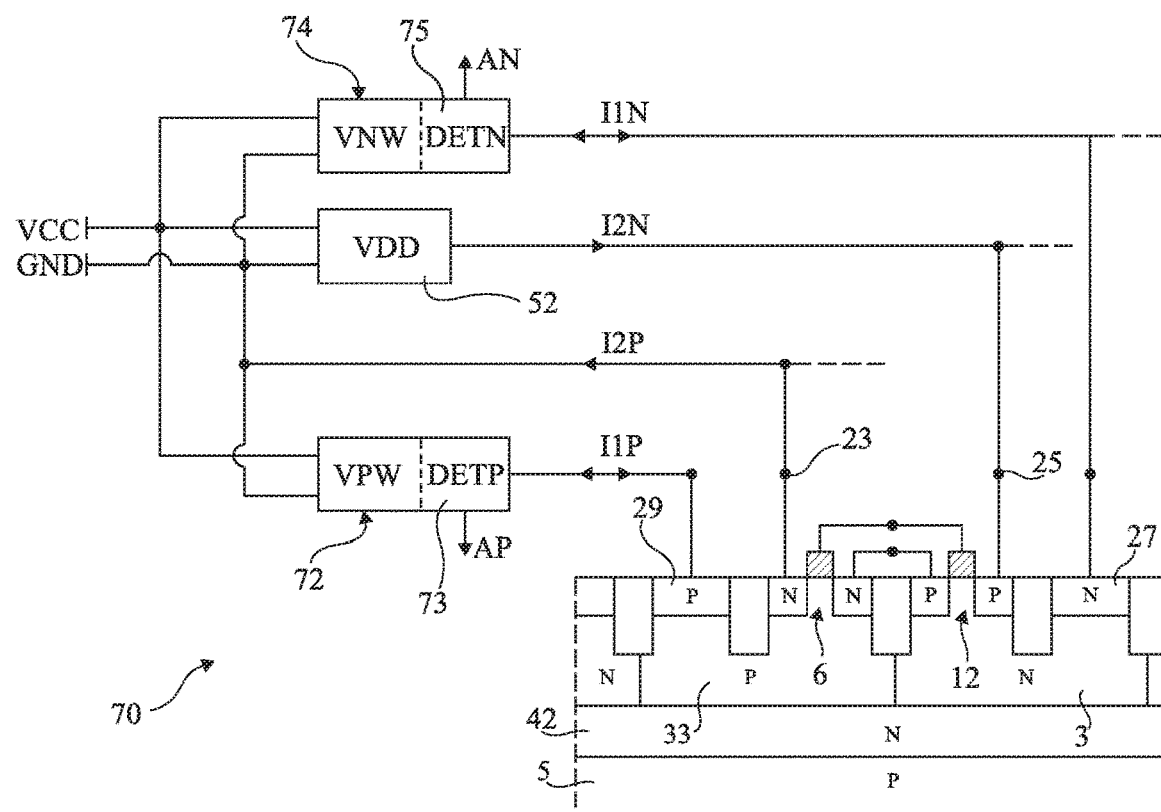
FIG. 4 shows an embodiment of an electronic chip of the second type protected against attacks.

FIG. 4 shows an embodiment of an electronic chip 70 of the second type protected against attacks. FIG. 4 schematically comprises a partial cross-section view of chip 70 and a representation of circuits comprised in this chip.

Chip 70 comprises elements of chip 40 described in relation with FIG. 2 and particularly of N wells 3 and P wells 33 extending on an N-type doped buried layer 42 covering a P-type doped substrate 5. Circuits, for example digital circuits, formed inside and on top of the wells, have power supply nodes 23 and 25. N wells 3 are provided with bias contacts 27 and P wells 33 are provided with bias contacts 29.

Power supply nodes 23 of the digital circuits are coupled to ground. Further, chip 70 comprises a power supply circuit 52 which provides a potential VDD applied to power supply nodes 25.

Bias contacts 29 of the P wells are coupled to a power supply circuit 72 which generates a potential VPW. Power supply circuit 72 comprises a circuit 73 (DETP) for detecting the bias current provided to the P wells. Detection circuit 73 is capable of generating a signal AP when the bias current is greater, in absolute value, than a threshold.

Bias contacts 27 of the N wells are coupled to a power supply circuit 74 which generates a potential VNW. Power supply circuit 74 comprises a circuit 75 (DETN) for detecting the bias current provided to the N wells. Detection circuit 75 is capable of generating a signal AN when the bias current is greater, in absolute value, than a threshold.

Power supply circuits 52, 72, and 74 are powered between potentials VCC and GND provided by a power supply device, not shown, external to the chip.

In case of a fault injection attack, the detection by chip 70 is similar to the detection by chip 50 of FIG. 3. Bias currents I1 detected by the chip are separated from power supply currents I2 of the normal chip activity. In the embodiment of chip 70, bias potentials VNW and VPW may be different from power supply potentials VDD and GND, for example, to accelerate the chip operation, or to decrease its power consumption.

Figure 5A:
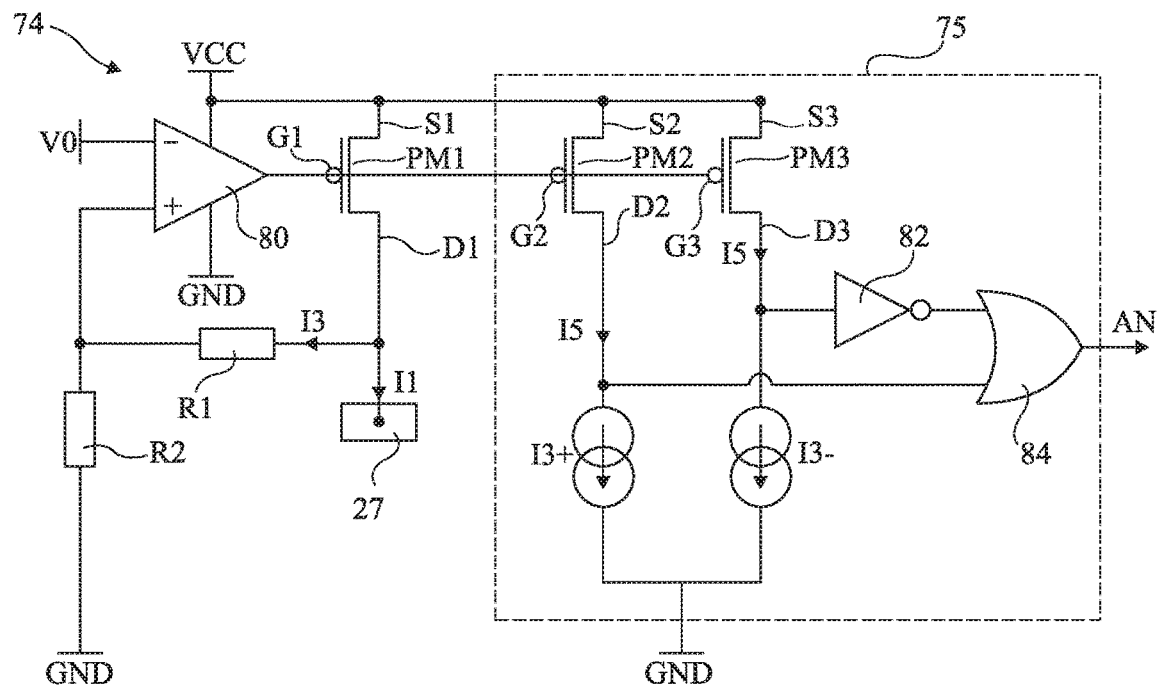
FIGS. 5A and 5B detail embodiments of power supply and detection circuits.

FIG. 5A details an embodiment of a power supply circuit 74 coupled to a bias contact 27 of an N well. Power supply circuit 74 comprises an operational amplifier 80 having its output coupled to gate G1 of a P-channel MOS transistor PM1. Two series-connected resistors R1 and R2 couple drain D1 of transistor PM1 to ground, the common node between the resistors being coupled to the positive input of amplifier 80. A regulated potential V0 is applied to the negative input of amplifier 80. Amplifier 80 is powered between ground GND and a node of application of a potential VCC provided by an external power supply device. Source S1 of transistor PM1 is coupled to potential VCC. Bias contacts 27 are coupled to drain D1.

Detection circuit 75 of power supply circuit 74 comprises two P-channel MOS transistors PM2 and PM3, forming current mirrors with transistor PM1, that is, having its gates G2 and G3 coupled to gate G1 and its sources D2 and D3 coupled to source S1. Drain D2 of transistor PM2 is coupled to ground by a current source which samples a current I3+ from drain D2. Drain D3 of transistor PM3 is coupled to ground by a current source which samples a current I3− from drain D3, current I3− being lower than current I3+. An inverter 82 couples drain D3 to an input of an OR gate 84 having its other input coupled to drain D2. The activation of the output of gate 84 generates signal AN.

When circuit 74 operates, a current I3 flows through resistors R1 and R2, current I3 being selected to be between currents I3+ and I3−. This current adds to bias current I1 in transistor PM1, and a current I5 equal to I1+I3 flows through each of transistors PM2 and PM3.

In normal operation, current I5 is between currents I3− and I3+, and output AN is deactivated.

In case of an attack attempt, as soon as current I5 comes out of the interval from I3− to I3+, the potential of drain D2 increases or the potential of drain D3 decreases, and output AN is activated. In other words, the appearing of a current I1 causes a variation of the potential provided by amplifier 80 which regulates the voltage provided by power supply circuit 74, and detection circuit 75 detects this variation to detect current I1. As a variation, detection circuit 75 may be replaced with any circuit capable of detecting a variation of a power supply circuit regulation potential.

The difference between currents I3 and I3− corresponds to the threshold of detection of a current I1 originating from bias contact 27 and the difference between currents I3 and I3+ corresponds to the threshold of detection of a current I1 flowing towards bias contact 27. As an example, the detection thresholds are in the range from 0.2 to 2 mA.

Figure 5B:
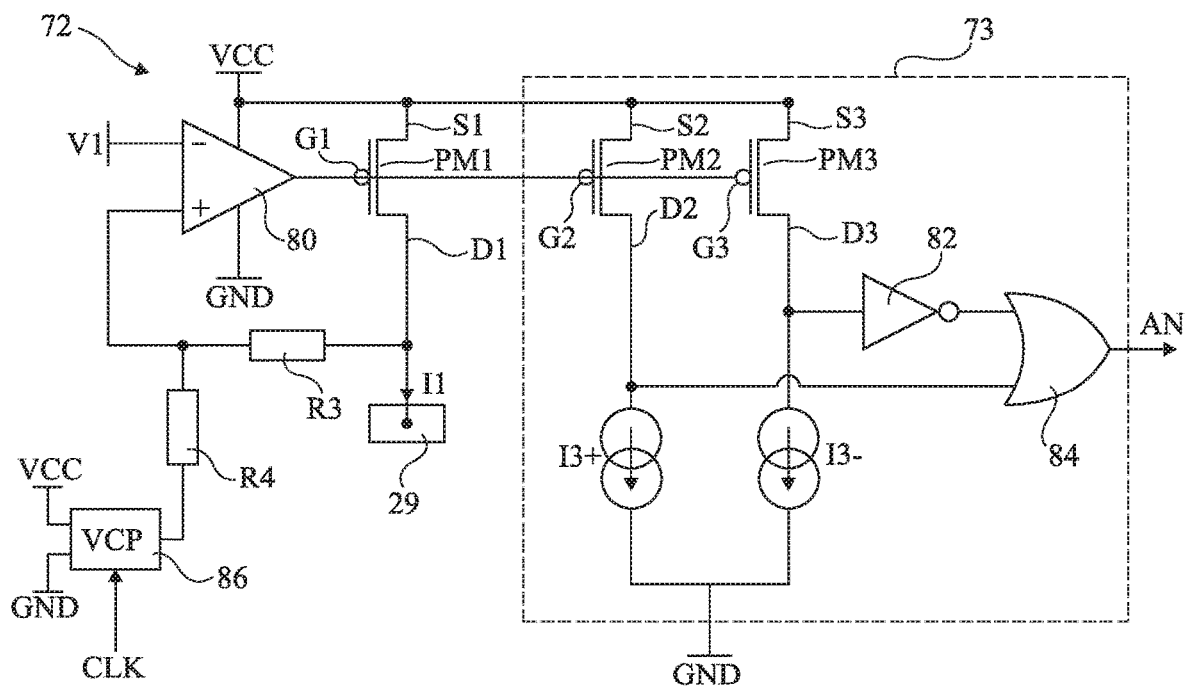

FIG. 5B details an embodiment of a power supply circuit 72 coupled to a bias contact 29 of an N well.

Power supply circuit 72 corresponds to power supply circuit 74 of FIG. 5A, resistors R1 and R2 being replaced with series-connected resistors R3 and R4 coupling drain D1 to a power supply circuit 86, the common node between resistors R3 and R4 being coupled to the positive input of amplifier 80. As an example, detection circuits 73 and 75 are similar.

Power supply circuit 86 provides a potential lower than the ground potential, based on potential VCC and on the ground potential. Circuit 86 may be a charge pump circuit synchronized by a clock (CLK). As a variation, detection circuit 73 may be replaced with a detection circuit capable of detecting a variation of a regulation potential of circuit 86.

Specific embodiments have been described. Various alterations, modifications, and improvements will readily occur to those skilled in the art. In particular, although in the described embodiments, the bias currents of P wells 33 and the bias currents of N wells 3 are simultaneously monitored by two detection circuits, variations are possible where the bias current of wells of a single conductivity type is monitored by a single detection circuit.

Further, although, in the described embodiments, the secure chips comprise digital circuits comprising MOS transistors 6 and 12, identically protected chips may also comprise analog circuits, for example, comprising components such as bipolar transistors, resistors, or diodes, the important point being that the chip comprises biased wells.

Further, although, in the described embodiments, a P-type doped substrate 5 has been provided, variations are possible where substrate 5 is replaced with an N-type doped substrate or with a support of silicon-on-insulator type, or also with a support made of another semiconductor.

Further, although specific detection circuits have been detailed in the described embodiments, other detection circuits capable of detecting a bias current are possible.

Various embodiments with different variations have been described hereabove. It should be noted that those skilled in the art may combine various elements of these various embodiments and variations without showing any inventive step. In particular, each of detection circuits 73 and 75 of the embodiment of a secure chip of the second type may replace one or the other of detection circuits 57 and 61 of the embodiment of a secure chip of the first type.

Further, embodiments adapted to integrated circuits of a first type and of a second type have been described. What has been described of course applies to other types of integrated circuit technologies, comprising various types of wells.

Such alterations, modifications, and improvements are intended to be part of this disclosure, and are intended to be within the spirit and the scope of the present invention. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A secure electronic chip comprising:
 a plurality of semiconductor wells in a semiconductor substrate, wherein the plurality of semiconductor wells comprises a first well of a first conductivity type and a second well of a second conductivity type;
 a plurality of transistors formed in the first and second wells, respectively;
 a well biasing current detection circuit configured to detect a bias current in the plurality of semiconductor wells; and
 a power supply circuit configured to provide a bias potential for biasing said wells, the detection circuit being configured to detect a variation of a potential regulating the bias potential.

2. The electronic chip of claim 1, wherein the detection circuit is configured to generate an alert signal when the bias current is greater, in absolute value, than a threshold.

3. The electronic chip of claim 1, wherein the power supply circuit comprises:
an operational amplifier having an input and an output; and
a first MOS transistor having a gate coupled to the output of the operational amplifier and a drain coupled to the input of the operational amplifier and to at least one of the wells, and wherein the detection circuit comprises a second MOS transistor forming a current mirror with the first MOS transistor, and the detection circuit being configured to detect a variation of a current in the second MOS transistor.

4. The electronic chip of claim 3, wherein the first MOS transistor includes a source connected to a voltage source terminal that is also connected to a power terminal of the operational amplifier, the first MOS transistor being configured to provide the bias potential to the at least one of the wells based on a source voltage at the voltage source terminal.

5. The electronic chip of claim 1, wherein the detection circuit includes a first circuit configured to detect first bias current of the first well and a second circuit configured to detect a second bias current of the second well.

6. The electronic chip of claim 1, wherein the first well is one of plural first wells that are formed in an upper portion of a semiconductor substrate of the second conductivity type and the second well is a portion of the substrate between the first wells.

7. The electronic chip of claim 1, comprising:
a substrate of the second conductivity type; and
a doped buried layer of the first conductivity type covering the substrate, wherein the first well and the second well extend on the doped buried layer.

8. The electronic chip of claim 1, wherein the plurality of transistors includes a first transistor in the first well, the electronic chip further comprising a bias contact that contacts the first well and is electrically isolated from the transistor, the detection circuit being electrically coupled to the bias contact and configured to detect the bias current in the first well which is indicative of an effort to tamper with the electronic chip.

9. The electronic chip of claim 8, further comprising a second power supply circuit that includes:
an operational amplifier having an input and an output; and
a first MOS transistor having a gate coupled to the output of the operational amplifier and a drain coupled to the input of the operational amplifier and to the bias contact, wherein the detection circuit comprises a second MOS transistor forming a current mirror with the first MOS transistor, and the detection circuit being configured to detect a variation of a current in the second MOS transistor.

10. An electronic device comprising:
a semiconductor substrate;
a first well of first conductivity type formed in the substrate;
a transistor formed in the first well;
a bias contact that contacts the first well and is electrically isolated from the transistor; and
a well biasing current detection circuit electrically coupled to the bias contact and configured to detect a first bias current in the first well that is indicative of an effort to tamper with the electronic device.

11. The electronic device of claim 10, wherein the detection circuit is configured to generate an alert signal when the first bias current is greater, in absolute value, than a threshold.

12. The electronic device of claim 10, wherein the detection circuit comprises:
a resistive element configured to conduct the first bias current; and
a comparator configured to detect a voltage across the resistive element.

13. The electronic device of claim 10, comprising a power supply circuit configured to bias the first well with a bias potential, the detection circuit being configured to detect the first bias current by detecting a variation of a potential regulating the bias potential.

14. The electronic device of claim 13, wherein the power supply circuit comprises:
an operational amplifier having an input and an output; and
a first MOS transistor having a gate coupled to the output of the operational amplifier and a drain coupled to the input of the operational amplifier and to the first well, and wherein the detection circuit comprises a second MOS transistor forming a current mirror with the first MOS transistor and the detection circuit is configured to detect a variation of a current in the second MOS transistor.

15. The electronic device of claim 10, further comprising a second well of a second conductivity type formed in the substrate, the detection circuit including a first circuit configured to detect the first bias current of the first well and a second circuit configured to detect a second bias current of the second well.

16. The electronic device of claim 15, wherein the first well is one of a plurality of first wells of the first conductivity type that are formed in an upper portion of the substrate and the second well is a portion of the substrate between the first wells.

17. The electronic device of claim 15, wherein the substrate is of the second conductivity type, further comprising:
a doped buried layer of the first conductivity type covering the substrate, wherein the first well and the second well extend on the doped buried layer.

18. A secure electronic chip comprising:
a substrate of a first conductivity type; and
a doped buried layer of a second conductivity type covering the substrate, a plurality of semiconductor wells formed on the doped buried layer, wherein the plurality of semiconductor wells comprises first wells of the first conductivity type and second wells of the second conductivity type;
a well biasing current detection circuit configured to detect a bias current in the plurality of semiconductor wells; and
a power supply circuit configured to provide a bias potential for biasing said wells, the detection circuit being configured to detect a variation of a potential regulating the bias potential.

19. The electronic chip of claim 18, wherein the power supply circuit comprises:
an operational amplifier having an input and an output; and
a first MOS transistor having a gate coupled to the output of the operational amplifier and a drain coupled to the input of the operational amplifier and to at least one of the wells, and wherein the detection circuit comprises a second MOS transistor forming a current mirror with the first MOS transistor, and the detection circuit being configured to detect a variation of a current in the second MOS transistor.

20. The electronic chip of claim 18, wherein the detection circuit includes a first circuit configured to detect a bias current of the first wells and a second circuit configured to detect a bias current of the second wells.

* * * * *